(No Model.)
J. STORY.
CONNECTION OF PIPES FOR CONDUCTING GAS OR FLUIDS.
No. 364,449. Patented June 7, 1887.
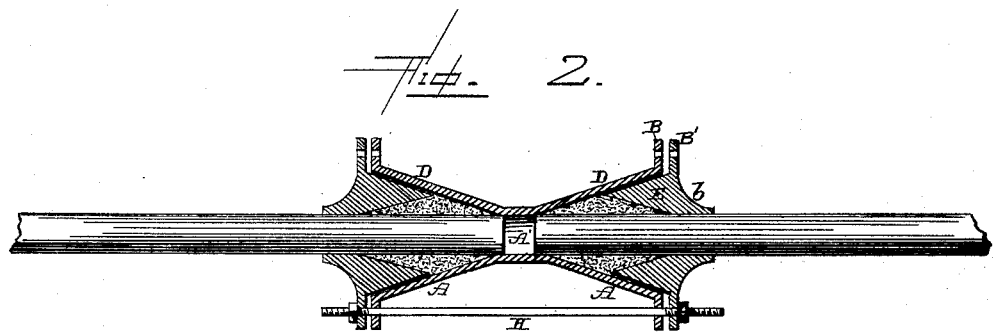
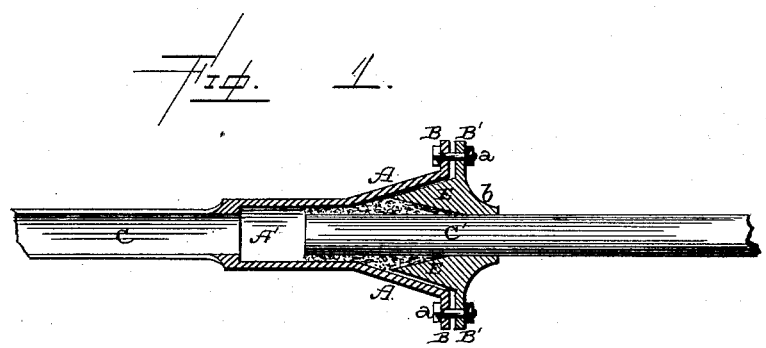

UNITED STATES PATENT OFFICE.

JOHN STORY, OF CASTLE SHANNON, PENNSYLVANIA, ASSIGNOR OF ONE-HALF TO SAMUEL SCOTT SMITH, OF SAME PLACE.

CONNECTION OF PIPES FOR CONDUCTING GAS OR FLUIDS.

SPECIFICATION forming part of Letters Patent No. 364,449, dated June 7, 1887.

Application filed December 27, 1886. Serial No. 222,642. (No model.)

*To all whom it may concern:*

Be it known that I, JOHN STORY, a citizen of the United States, residing at Castle Shannon, in the county of Allegheny and State of Pennsylvania, have invented certain new and useful Improvements in Connections of Pipes for Conducting Gas or Fluids; and I do hereby declare the following to be a full, clear, and exact description of the invention, such as will enable others skilled in the art to which it appertains to make and use the same.

My invention relates to an improvement in the connection of pipes for conducting gas or fluids; and it consists in forming a conical socket or chamber at the end of a pipe, into which chamber the plain or spigot end of the pipe that is to be connected is introduced, and is therein surrounded by a packing, compressed by a conical or wedge-shaped follower, actuated by screw-bolts that pass through flanges connected therewith. It consists, also, in an arrangement by which one section of a main line can be removed and replaced without disturbing other sections, as will be described hereinafter.

The accompanying drawings represent my invention.

Figure 1 represents a longitudinal section of the connecting-chamber and follower, with pipes. Fig. 2 shows two chambers connected with pipes and followers, in longitudinal section.

Fig. 1, C represents a pipe for conducting gas or fluids. It has on one of its ends a uniform enlargement, A', and from this expands a coniform or funnel-shaped socket or chamber, A, that is surrounded on its edge by a flange, B. The enlargement A' on the pipe C is of a length and width to permit the end of an inserted pipe, C', to be pushed far enough into it to disengage its other end, so that it can be raised from its connection without disturbing the remainder when a removal of the pipe is necessary.

The conical chamber or socket A is surrounded by a flange, B, with holes for bolts. The flange B', of the size of the former, is likewise provided with bolt-holes, and forms a part of the follower E and collar b, that slides on the pipe C'. The end of the pipe C', passing through the chamber A, enters a short distance into the enlarged end A' of the pipe C, and is surrounded by the packing in the chamber.

The follower E is conical or wedge-shaped, and is so constructed to compress the packing, not only in a direct line toward the narrow end of the chamber, when the flanges B and B' are drawn toward each other, but also to press it laterally against the pipe and the wall of the chamber.

The double chamber, Fig. 2, does not vary in its construction from the single one, but is entirely detached from the pipes that are introduced at opposite ends to meet at a short distance of each other in the middle of the chamber. A guide-rod, H, with screws and nuts at both ends, is passed temporarily through bolt-holes in the flanges B B' of both chambers, for the purpose of guiding the followers when the bolts are being tightened, so as to avoid displacement or uneven pressure. The rod H, after the packing has been sufficiently compressed, is to be removed and bolts substituted therefor.

I do not claim the invention of a packing-chamber, for they have been known and been in use for a long time; but my invention of the conical form of the chamber, combined with a conical or wedge-shaped follower, appears to be new and offers advantages that are not obtainable by those in which the pressure of the follower is in one direction only. The pressure exerted by the conical follower, increased by the diminishing diameter of the chamber, not only pushes the packing down to confine it in the narrow end of the chamber, but being annular and wedge-shaped, the follower partly divides the packing, and presses it not only down but also sidewise, holding it firmly around the pipe and against the wall of the chamber.

Having described my invention, I claim—

The combination of the pipes C C', with the funnel-shaped socket or chamber A, provided with a uniform enlargement, A', and the flange B, with the follower E, provided with the flanges B' and collar b, and the clamping-bolts a, the follower being inclined at its inner end on both sides and the loose packing extending only to the uniform enlargement, substantially as described.

In testimony whereof I affix my signature in presence of two witnesses.

JOHN STORY.

Witnesses:
LOUIS MOESER,
IG. STAUFFER.